(12) United States Patent
Yajima et al.

(10) Patent No.: US 9,183,966 B2
(45) Date of Patent: Nov. 10, 2015

(54) COMPOSITE RESINOUS PARTICLES, METHOD OF PRODUCING COMPOSITE RESINOUS PARTICLES, COMPOSITE RESIN MOLDED BODY, AND METHOD OF PRODUCING SAME

(75) Inventors: Takeru Yajima, Hokuto (JP); Toshiyuki Abe, Kofu (JP); Toru Sakai, Yokohama (JP); Kentaro Miyoshi, Kai (JP)

(73) Assignee: TAIYO NIPPON SANSO CORPORATION, Tokyo (JP)

(*) Notice: Subject to any disclaimer, the term of this patent is extended or adjusted under 35 U.S.C. 154(b) by 143 days.

(21) Appl. No.: 13/983,618

(22) PCT Filed: Feb. 7, 2011

(86) PCT No.: PCT/JP2011/052538
§ 371 (c)(1),
(2), (4) Date: Aug. 5, 2013

(87) PCT Pub. No.: WO2012/107991
PCT Pub. Date: Aug. 16, 2012

(65) Prior Publication Data
US 2013/0310522 A1 Nov. 21, 2013

(51) Int. Cl.
C08J 3/12 (2006.01)
H01B 1/12 (2006.01)
C08J 3/205 (2006.01)
C08K 7/24 (2006.01)

(52) U.S. Cl.
CPC ... *H01B 1/12* (2013.01); *C08J 3/12* (2013.01); *C08J 3/205* (2013.01); *C08K 7/24* (2013.01); *C08J 2327/18* (2013.01)

(58) Field of Classification Search
None
See application file for complete search history.

(56) References Cited

U.S. PATENT DOCUMENTS

| | | | | |
|---|---|---|---|---|
| 5,403,873 A | * | 4/1995 | Nakamura et al. | 523/201 |
| 2002/0086198 A1 | | 7/2002 | Ilno et al. | |
| 2002/0161101 A1 | * | 10/2002 | Carroll et al. | 524/495 |
| 2004/0211942 A1 | * | 10/2004 | Clark et al. | 252/500 |
| 2005/0070658 A1 | * | 3/2005 | Ghosh et al. | 524/495 |
| 2010/0255185 A1 | | 10/2010 | Bahnmueller et al. | |
| 2012/0241692 A1 | | 9/2012 | Yajima et al. | |

FOREIGN PATENT DOCUMENTS

| | | |
|---|---|---|
| CN | 1656574 | 8/2005 |
| CN | 1898753 A | 1/2007 |
| CN | 101098921 | 1/2008 |
| CN | 101132067 | 2/2008 |
| JP | 08-506612 | 7/1996 |
| JP | 2000-511245 | 8/2000 |
| JP | 2001-158827 | 6/2001 |
| JP | 2003-100147 | 4/2003 |
| JP | 2003-192914 | 7/2003 |
| JP | 2003-221510 | 8/2003 |
| JP | 2003-315531 | 11/2003 |
| JP | 2004-030926 | 1/2004 |
| JP | 2004-087427 | 3/2004 |
| JP | 2004-127737 | 4/2004 |
| JP | 2006-008945 | 1/2006 |
| JP | 2006-016450 | 1/2006 |
| JP | 2006-505483 | 2/2006 |
| JP | 2006-069165 | 3/2006 |
| JP | 2006-282843 | 10/2006 |
| JP | 2007-035811 | 2/2007 |
| JP | 2007-039623 | 2/2007 |
| JP | 2007-222803 | 9/2007 |
| JP | 2008-537016 | 9/2008 |
| JP | 2008-239765 | 10/2008 |
| JP | 2009-074072 | 4/2009 |
| JP | 2009-109910 | 5/2009 |
| JP | 2009-160754 | 7/2009 |
| JP | 2010-189621 | 9/2010 |
| JP | 2010-235320 | 10/2010 |
| WO | WO 94/18264 A1 | 8/1994 |
| WO | WO 97/45257 A1 | 12/1997 |
| WO | WO 2004/048263 A1 | 6/2004 |
| WO | WO 2006/105466 A2 | 10/2006 |
| WO | WO 2009/071220 A2 | 6/2009 |
| WO | WO 2009/098779 | 8/2009 |

OTHER PUBLICATIONS

Ning Li et al; "Nano Letters", 2006, vol. 6, No. 6, pp. 1141-1145.
M.B. Bryning et al; "Advanced Materials", May 2005, vol. 17, Issue 9, pp. 1186-1191.
Search Report in EP 10835735.1 dated Sep. 1, 2014.
English language translation of Office Action in JP 2012-556675 dated Oct. 7, 2014.
International Search Report for PCT/JP2011/052538, mailed Apr. 26, 2011.
International Search Report in PCT/JP2010/062108 mailed Aug. 10, 2010.
Office Action in CN 201080055235.0 dated Mar. 14, 2013.
Office Action issued in Chinese App. No. 201180066838.5 dated Dec. 23, 2014 (with partial English translation).
U.S. Appl. No. 13/514,411, filed Jun. 7, 2012 in the name of Yajima et al.
Office Action issued in U.S. Appl. No. 13/514,411 dated Dec. 2, 2013.

* cited by examiner

*Primary Examiner* — Robert C Boyle
(74) *Attorney, Agent, or Firm* — Nixon & Vanderhye P.C.

(57) ABSTRACT

A composite resin material particle is produced by a method including the steps of: forming a mixed slurry containing a resin material particle and carbon nanotubes; supplying the mixed slurry to a pressure vessel, followed by supplying carbon dioxide with stirring an inside of the pressure vessel; holding the inside of the pressure vessel at a temperature and at a pressure which allow the carbon dioxide to be maintained in a subcritical or supercritical state; and transferring the carbon dioxide to the outside of the pressure vessel.

13 Claims, 2 Drawing Sheets

COMPOSITE RESINOUS PARTICLES, METHOD OF PRODUCING COMPOSITE RESINOUS PARTICLES, COMPOSITE RESIN MOLDED BODY, AND METHOD OF PRODUCING SAME

This application is the U.S. national phase of International Application No. PCT/JP2011/052538 filed 7 Feb. 2011 which designated the U.S., the entire content of which is hereby incorporated by reference.

TECHNICAL FIELD

The present invention relates to a composite resin material particle and a method for producing the same, a composite resin molding using such composite resin material particles, and a method for producing the same.

BACKGROUND ART

Carbon nanotubes are a tubular material in which a single- or multi-walled graphene sheet formed of carbon atoms is rolled into a cylinder. These carbon nanotubes have different properties, depending on the way the graphene sheet is rolled into a tube, and on the shape of the carbon nanotubes themselves, such as the diameter and crystallinity of the tube, and others, and are expected as a material that is highly attractive in characteristics of the material itself, such as electrical and mechanical properties, and specific gravity, in comparison with metallic materials.

In order to make effective use of mechanical and electrical properties of carbon nanotubes in producing composite materials in combination with other materials, it is necessary to mix carbon nanotubes uniformly into other materials. For example, when a solid material and a liquid material having carbon nanotubes dispersed therein are mixed, it is necessary to employ a liquid material in which the carbon nanotubes are individually and separately dispersed (which is referred to as a "dispersion"). However, carbon nanotubes have the property of attracting each other by van der Waals forces, and are known to form bundles or agglomerates with one another.

As methods for producing carbon nanotubes, there are known vapor-phase synthesis methods using thermal CVD in which a catalyst and a raw-material gas are simultaneously placed into a reactor to synthesize carbon nanotubes, and on-substrate synthesis methods in which a raw material gas is applied onto a substrate coated with a catalyst.

Among these methods, on-substrate synthesis methods allow the formation of carbon nanotubes in which the carbon nanotubes assemble each other and are vertically oriented, by applying a catalyst to a very smooth surface of a substrate, such as silicon and silicon oxide in particular, and growing the carbon nanotubes on the surface at a high density.

Carbon nanotubes which are produced by an on-substrate synthesis method are uniform in their diameter, layer number, and length, and exhibit high crystallinity, and therefore it is expected that carbon nanotubes having a very small number of defects can be obtained. In addition, carbon nanotubes which are produced by an on-substrate synthesis method have longer lengths and exhibit higher crystallinity, in comparison with those which are produced by a vapor-phase synthesis method, and thus have an advantage that when a composite material with other materials is formed, it is easy to obtain various properties, such as improvements in the electrical conductivity, thermal conductivity, and mechanical strength, and a suppression of the linear expansion of the composite material.

In particular, composite resins of carbon nanotubes and resins are used in various applications in many fields such as electronic parts and automobile parts. These composite resins require the properties including electrical conductivity in order to achieve antistatic performance and high thermal conductivity in order to avoid thermal expansion in a molding process and a cutting process. In the past, there have been supposed resin composite materials in which to resins are added spherical carbon materials or carbon fibers such as carbon black and Ketjen Black, or fibrous carbon materials such as carbon nanotubes, as a filler used in imparting electrical or thermal conductivity to resin moldings (See, for example, Patent Literatures 1 to 3).

As methods for kneading carbon nanotubes and a resin, methods are known in which kneading is usually carried out under high shearing force using a mill or the like. In these methods, however, a high shear operation will be required in order to achieve homogeneous mixing of a fibrous carbon material, such as carbon nanotubes, into a resin using a mill or the like.

Such methods present a problem of reducing performance in electrical conductivity and others because in the resin, the carbon nanotubes are subjected to shearing force, so that they are broken into short pieces, resulting in a decreased number of contacts with one another in the resin. Further, such methods cause the carbon nanotubes to separate away from each other in the resin, leading to the destruction of nanonet structures in which the carbon nanotubes are entangled with one another in the resin, and thus do not allow the strength, an intrinsic property of carbon nanotube, to be exhibited in the composite resin, and as a result, present a problem that the strength of the composite resin is not increased.

When short carbon nanotubes are dispersed in isolation in a resin, binding at the interface between the resin and the carbon nanotube is weak, and there is presented a problem that a phenomenon is observed in which the carbon nanotubes are released easily out of the resin.

Since carbon materials such as carbon nanotubes are expensive, on the other hand, there is a desire to reduce material costs. Therefore, it is required that carbon nanotubes be homogeneously dispersed to obtain high electrical and thermal conductivities at concentrations as low as possible. For carbon nanotubes which are to be added, it is also known that the narrower the diameters and the longer the lengths of the carbon nanotubes, the lower concentrations at which they are added provide high degrees of electrical conductivity, thermal conductivity, strength, and others.

Incidentally, Patent Literature 4 discloses a method for the modification of the surface of a resin molded article with carbon nanotubes by immersing the resin molded article in a dispersion of the carbon nanotubes, followed by treatment under an atmosphere of carbon dioxide in a subcritical or supercritical state.

However, the method disclosed in Patent Literature 4 presents a problem that the modification of a resin molded article with carbon nanotubes is affected by gravity because in this method, the carbon nanotubes are poorly dispersive, resulting in carbon nanotube agglomeration, sedimentation, or the like during the treatment under an carbon dioxide atmosphere. In addition, there is presented a problem that the resin surface of a resin molded article is swollen under an atmosphere of carbon dioxide in a subcritical or supercritical state, whereby its shape and color are affected and additional processing of the resin surface is required. Here, the "modification" refers to a state where carbon nanotubes have been attached to or fixed on the resin surface.

In addition, Patent Literatures 5 and 6 each disclose a process in which the surface of resin particles is impregnated with supercritical carbon dioxide, thereby to soften the resin surface and an ultrasonic vibration method is used to disperse and fix the carbon nanotubes in a dispersion uniformly on the resin particle surface. For stirring with ultrasonic vibration, a high-pressure generator itself is required to be placed under high-pressure carbon dioxide, resulting in a problem of increasing the cost. Transmitting of ultrasonic vibration from the outside of the high pressure vessel poses a problem that its transmitting to a fluid inside the vessel is not necessarily adequate. Thus, there is a problem that the cost is increased, in order to achieve a device capable of sufficient stirring.

CITATION LIST

Patent Literature

[Patent Literature 1]
   Japanese Patent Application Publication No. 2006-069165
[Patent Literature 2]
   Japanese Patent Application Publication No. 2004-030926
[Patent Literature 3]
   Japanese Unexamined Patent Application, First Publication No. 2004-127737
[Patent Literature 4]
   Japanese Unexamined Patent Application, First Publication No. 2007-035811
[Patent Literature 5]
   Japanese Patent Application No. 2009-010094
[Patent Literature 6]
   Japanese Unexamined Patent Application, First Publication No. 2010-189621

SUMMARY OF INVENTION

Technical Problem

The present invention has been made in view of the above-mentioned circumstances, and an object thereof is to provide a composite resin material particle and a composite resin molding, each of which has a high electrical conductivity by the addition of a small amount of carbon nanotubes, and of providing simple and highly productive methods for producing such a composite resin material particle and such a composite resin molding.

Solution to Problem

In order to achieve the object mentioned above,
the invention according to claim 1 is directed to a composite resin material particle which is used as a raw material for a composite resin molding, the composite resin material particle including a resin material particle and carbon nanotubes at not less than 0.003% and not more than 0.1% by mass relative to the resin material particle, have a volume resistivity of $1.0 \times 10^8$ Ω·cm or less.

The invention according to claim 2 is directed to the composite resin material particle according to claim 1, wherein the carbon nanotubes have an average length of not less than 50 μm and not more than 250 μm.

The invention according to claim 3 is directed to the composite resin material particle according to claim 1 or 2, wherein the resin material particle is of a fluorine-containing resin material.

The invention according to claim 4 is directed to a method for producing a composite resin material particle which is used as a raw material for a composite resin molding, wherein the method includes the steps of: forming a mixed slurry containing at least a resin material particle and carbon nanotubes; supplying the mixed slurry to a pressure vessel; supplying carbon dioxide with stirring an inside of the pressure vessel; holding the inside of the pressure vessel at a temperature and at a pressure which allow the carbon dioxide to be maintained in a subcritical or supercritical state; and transferring the carbon dioxide to the outside of the pressure vessel.

The invention according to claim 5 is directed to the method for producing the composite resin material particle according to claim 4, wherein the step of forming the mixed slurry includes the step of mixing the carbon nanotube and a dispersing agent into water to form an aqueous dispersion of the carbon nanotubes; and the step of adding the resin material particles and alcohols to the aqueous dispersion.

The invention according to claim 6 is directed to the method for producing the composite resin material particle according to claim 5, wherein the alcohols are any one or a mixture of two or more of methanol, ethanol, isopropyl alcohol, n-butyl alcohol, propylene glycol, diethyl ether, dimethyl ether, ethyl methyl ether, and ethylene glycol.

The invention according to claim 7 is directed to the method for producing the composite resin material particle according to claim 5 or 6, wherein the alcohols are simultaneously supplied when the liquid carbon dioxide is supplied.

The invention according to claim 8 is directed to the method for producing the composite resin material particle according to any one of claims 4 to 7, wherein the carbon nanotubes has an average length of not less than 50 μm and not more than 250 μm.

The invention according to claim 9 is directed to the method for producing the composite resin material particle according to any one of claims 4 to 8, wherein the resin material particle is of a fluorine-containing resin material.

The invention according to claim 10 is directed to the method for producing the composite resin material particle according to any one of claims 4 to 9, further including the step of collecting the carbon dioxide which is transferred out of the pressure vessel.

The invention according to claim 11 is directed to the method for producing the composite resin material particle according to claim 10, wherein the amount of recovery of any one or more of the water, the alcohols, and the dispersing agent that have been transferred together with the collected carbon dioxide is measured, and the amount of supply of the carbon dioxide to the pressure vessel is selected.

The invention according to claim 12 is directed to the method for producing the composite resin material particle according to claim 10 or 11, wherein the carbon dioxide which has been transferred out of the pressure vessel is liquefied, followed by supplying the liquefied carbon dioxide to the pressure vessel.

The invention according to claim 13 is directed to a composite resin molding prepared by using the composite resin material particles according to any one of claims 1 to 3 as a raw material, wherein a content of the carbon nanotubes is not less than 0.003% and not more than 0.1% by mass relative to the resin material particle, and a volume resistivity is $1.0 \times 10^8$ Ω·cm or less.

The invention according to claim 14 is directed to a method for producing a composite resin molding in which the composite resin material particles according to any one of claims 1 to 3 are used as a raw material, the method including subjecting the composite resin material particles to pressure forming, followed by calcining.

Advantageous Effects of Invention

According to a composite resin material particle of the present invention, it is possible to provide a composite resin material particle including a resin material particle and carbon nanotubes, wherein a content of the carbon nanotubes is not less than 0.003% and not more than 0.1% by mass relative to the resin material particle, and a volume resistivity is $1.0 \times 10^8$ Ω·cm or less.

A method for producing a composite resin material particle includes the steps of: forming a mixed slurry containing at least a resin material particle and carbon nanotubes; supplying carbon dioxide to the mixed slurry with stirring while adjusting the amount of supply of the carbon dioxide; holding a temperature and a pressure which allow the carbon dioxide to be maintained in a subcritical or supercritical state; and removing the dispersing agent from the composite resin material particle by means of the carbon dioxide. The preparation of a vessel equipped with a stirrer eliminates the need for the treatment of dispersing the carbon nanotubes for a long period of time using an ultrasonic wave generating device. Therefore, it is possible to produce composite resin material particles at a high productivity by a simple method.

According to a composite resin molding of the present invention, it is possible to provide a composite resin molding including resin material particles and carbon nanotubes, wherein a content of the carbon nanotubes is not less than 0.003% and not more than 0.1% by mass relative to the resin material particles, and a volume resistivity is $1.0 \times 10^8$ Ω·cm or less.

A method for producing a composite resin molding includes the step of pressure forming the above-mentioned composite resin material particles, followed by calcining. Therefore, it is possible to produce a composite resin molding by a simple method.

DESCRIPTION OF EMBODIMENTS

Figure 1:
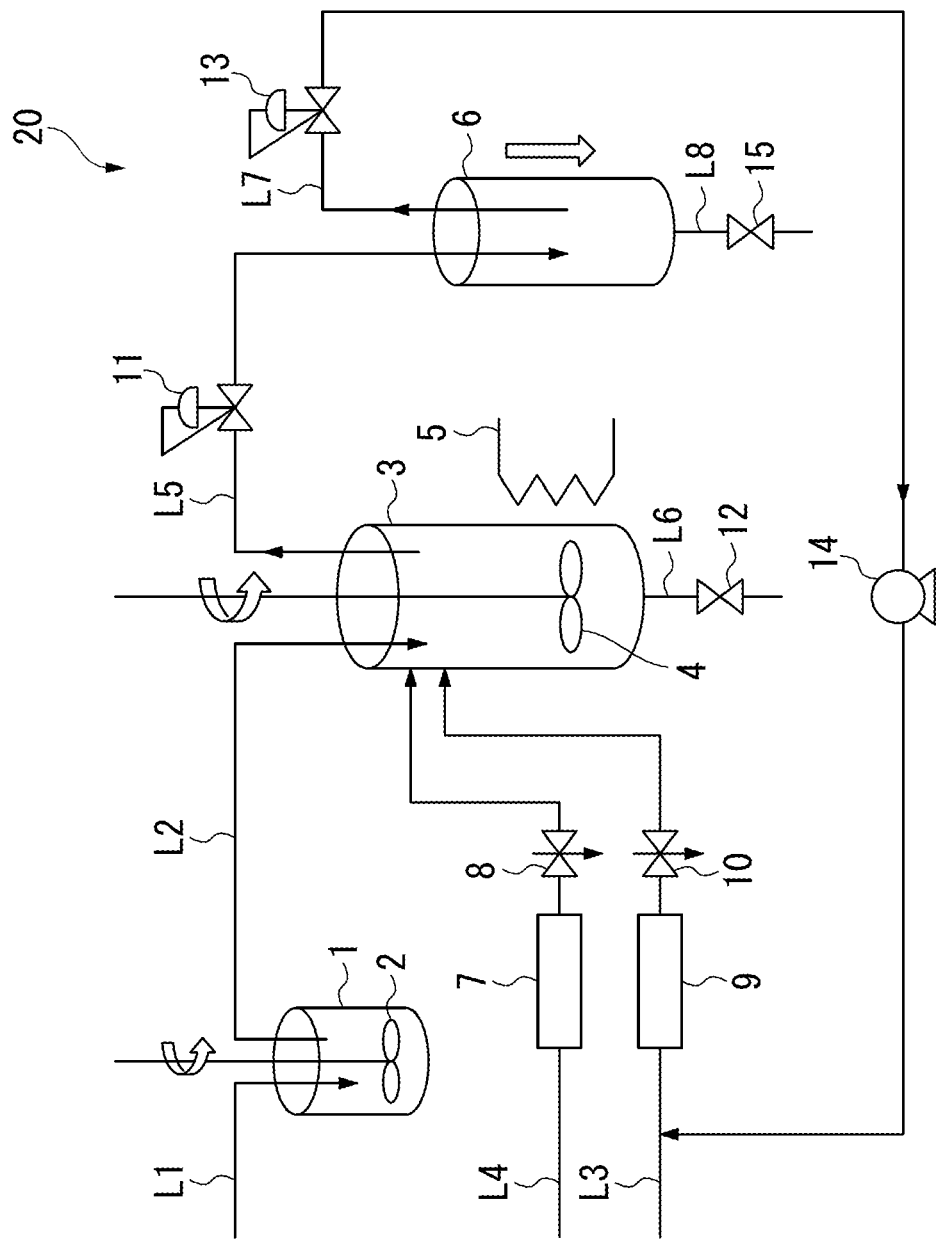
FIG. 1 is a system diagram schematically illustrating production equipment used in a method for producing a composite resin material particle, which is an embodiment to which the present invention is applied.

The following will explain, in detail with reference to the drawings, a composite resin material particle and a method for producing the same, each of which is an embodiment to which the present invention is applied.

In the drawing(s) used in the explanation which follows, characteristic portions may be enlarged for convenience, to make the features clearer, and thus the dimensional ratios of the respective components, for example, are not always the same as the actual ratios.

<Composite Resin Material Particles>

First, an explanation is given on the constitution of a composite resin material particle which is an embodiment to which the present invention is applied.

A composite resin material particle according to the present embodiment is of a composite resin material in which an additive or additives for providing a resin with functionalities, such as electrical conductivity, thermal conductivity, and mechanical properties, have been added. More particularly, a composite resin material particle according to the present embodiment is of an electrically conductive composite resin material in which electrical conductivity has been provided by adding an electrical conductor to a resin.

Specifically, a composite resin material according to the present embodiment includes a resin material particle and carbon nanotubes, and has a volume resistivity of $1.0 \times 10^8$ Ω·cm or less in a small content of the carbon nanotubes, which is not less than 0.003% by mass and not more than 0.1% by mass, preferably not more than 0.05% by mass, more preferably not more than 0.01% by mass, relative to the resin material particles.

The resin material of which the resin material particles are made up is not limited in particular, and a most suitable resin can be selected as appropriate when actually used, to impart electrical conductivity thereto. As the resin material, use can be made of, for example, a fluorine-containing resin, a polycarbonate resin, an olefin resin, a polyetheretherketone resin, a formalin-derived resin, an ester resin, or a styrene resin. Among these resins, a fluorine-containing resin is preferred because it can be easily molded by calcining after its preforming.

As the fluorine-containing resin, various types of fluorine-containing resin can be used without any particular limitations. Examples of fluorine-containing resin include, for example, polytetrafluoroethylene (tetrafluororesin, PTFE), which is a perfluorinated resin; perfluoroalkoxy fluororesin (PFA), which is a copolymer of a fluorinated resin; tetrafluoroethylene-hexafluoropropylene copolymer (FEP); ethylene-tetrafluoroethylene copolymer (ETFE); ethylene-chlorotrifluoroethylene copolymer (ECTFE); polychlorotrifluoroethylene (trifluororesin, PCTFE), which is a partially fluorinated resin; polyvinylidene fluoride (PVDF); polyvinyl fluoride (PVF); and others.

The particle diameters of the resin material particles are not limited in particular, as long as they ensure sufficient surface areas, and at the same time, are dispersible in the step of forming a mixed slurry containing carbon nanotubes and the resin material particles, which is mentioned below. The particle diameters of the resin material particles are, for example, preferably 1 to 500 μm, more preferably 25 to 100 μm.

The type of carbon nanotubes, which are applicable in a composite resin material particle according to the present embodiment, are not limited in particular, as long as a small amount of addition of the carbon nanotubes which is, for example, not more than 0.1% by mass relative to the resin material particles allows the composite resin material particles to exhibit a volume resistivity of $1.0 \times 10^8$ Ω·cm or less. Specifically, as ones of such a type, long carbon nanotubes with an average length of not less than 50 lam and not more than 250 μm are preferably used. More preferably, long carbon nanotubes with an average length of not less than 100 μm and not more than 150 μm are used.

In this connection, long carbon nanotubes having an average length of not less than 50 μm and not more than 250 μm are readily available by on-substrate synthesis methods conventionally known in the art (see, the method disclosed in Japanese Patent Application No. 2007-222803, titled "CATALYST FOR GROWING CARBON NANOSTRUCTURE, METHOD FOR PRODUCING CARBON NANOSTRUCTURE, AND GAS AND CARRIER GAS FOR, AND APPARATUS FOR PRODUCING CARBON NANOSTRUCTURE", for example).

For composite resin material particles according to the present embodiment, the long carbon nanotubes are dispersed uniformly on the surface of the resin material particles and completely fixed in extremely small thicknesses on a superficial layer on the resin material particles. This allows efficient formation of a network (electrically conductive network) on the surface of the resin material particles, in spite of small amounts of addition of the carbon nanotubes. In addition, after the carbon nanotubes are fixed on the surface of the composite resin material particles, the removal of the dispersing agent which inhibits electrical conductivity makes electrical conductive paths between the carbon nanotubes more effectively work in spite of small amounts of addition of the carbon nanotubes. Therefore, the composite resin material particles are capable of exhibiting high electrical conductivity, thermal conductivity, and strength properties which the carbon nanotubes possess.

<Composite Resin Moldings>

Secondly, an explanation is given on the constitution of a composite resin molding which is an embodiment to which the present invention is applied. A composite resin molding according to the present embodiment is one which is molded using the above-mentioned composite resin material particles as a raw material. Thus, the composite resin molding includes a resin material particle and carbon nanotubes, and has a volume resistivity of $1.0 \times 10^8$ Ω·cm or less in a small content of the carbon nanotubes, which is not less than 0.003% by mass and not more than 0.1% by mass, preferably not more than 0.05% by mass, more preferably not more than 0.01% by mass, relative to the resin material particles.

The aspect of the composite resin moldings is not limited in particular and a most suitable form can be selected as appropriate when actually used, and thus there can be provided a variety of resin molded articles having electrical conductivity imparted thereto. These resin molded articles include specifically, for example, IC trays, wafer carriers, hoses for chemicals, sealing agents, and others.

Composite resin moldings according to the present embodiment have high electrical conductivity because an electrically conductive network derived from the carbon nanotubes is formed within the molding.

<Methods for Producing Composite Resin Material Particles and Composite Resin Moldings>

Thirdly, an explanation is given on a method for producing a composite resin material particle, which is an embodiment of the present invention, in conjunction with a method for producing a composite resin molding using such particles. FIG. 1 is a system diagram schematically illustrating production equipment used in a method for producing a composite resin material particle which is an embodiment of the present invention.

(Step 1)

Step 1 is the step of preparing a dispersion in which long carbon nanotubes are dispersed in a solvent. Specifically, as shown in FIG. 1, a vessel 1 is first charged through a line L1 or the like with a solvent, long carbon nanotubes, and one or both of a dispersing agent and a surfactant, which are mixed with stirring using a stirrer 2.

As the solvent, water or an organic solvent can be used. In the present embodiment, water is preferably used as the solvent, in order to make an aqueous dispersion in which the long carbon nanotubes can be allowed to be dispersed more homogeneously.

The explanation which follows is made on the case where, in the present embodiment, an aqueous dispersion is used as the dispersion.

The dispersing agent is not limited in particular, and a dispersing agent suitable to the kind of solvent can be selected as appropriate. As the dispersing agent, use can be made of sodium dodecyl sulfate (SDS) and sodium dodecylbenzenesulphate (SDBS); synthetic polymers, such as polyvinyl pyrrolidone and poly(aniline sulfonic acid); bile acids, such as cholic acid; proteins; DNAs; peptides; organic amine compounds; and others.

In addition, for dispersing agents, it is desirable to select and use a dispersing agent having a boiling point lower than the molding temperature of the resin material particles to be modified.

The amount of addition of the dispersing agent is such that the weight ratio of the carbon nanotube and the dispersing agent is of the order of 1:1 in cases where common carbon nanotubes having lengths of 10 μm or less are used. In contrast, in cases where long carbon nanotubes are used, the amount of addition of the dispersing agent needs to be such that the weight ratio of the carbon nanotube and the dispersing agent is of the order of 5:1 to 50:1.

Even in cases where long carbon nanotubes which are relatively difficult in dispersion in the solvent are used, an aqueous dispersion in which they have been homogeneously dispersed can be obtained by the addition of a dispersing agent in the aforementioned manner.

(Step 2)

Step 2 is the step of adding alcohols to the aqueous dispersion of the long carbon nanotubes prepared in the above-mentioned Step 1, thereby to prepare a carbon nanotube dispersion in which the alcohols are predominantly present.

Specifically, as shown in FIG. 1, to the vessel 1 containing the aqueous dispersion of the carbon nanotubes, alcohols are supplied through the line L1 and mixed with stirring using the stirrer 2. By adding alcohols to the aqueous dispersion which is based on water having high polarity in the aforementioned manner, the long carbon nanotubes that have been homogeneously dispersed in the aqueous dispersion are changed into a slightly unstable condition.

The alcohols are not limited in particular, and can be selected as appropriate, depending on the kind of resin material particles to be dispersed in the aqueous dispersion. Specific examples of the alcohols include any one or a mixture of two or more of methanol, ethanol, isopropyl alcohol, n-butyl alcohol, propylene glycol, diethyl ether, dimethyl ether, ethyl methyl ether, and ethylene glycol.

The explanation which follows is made on the case where, in the present embodiment, ethanol is used as the alcohols.

(Step 3)

Step 3 is the step of adding resin material particles to the dispersion of the long carbon nanotubes having the alcohols as main components which has been prepared in Step 2, and stirring the mixture.

Specifically, as shown in FIG. 1, resin material particles are added and mixed while stirring inside the vessel 1 containing the dispersion of the long carbon nanotubes in which ethanol is predominantly present.

The explanation which follows is made on the case where, in the present embodiment, a fluorine-containing resin is used as the resin material.

The carbon nanotubes in the dispersion in which they have gently changed into an unstable condition by the addition of ethanol in the above-mentioned Step 2 will begin to adsorb gently on the surface of the fluorine-containing resin particles added in Step 3, when the fluorine-containing resin particles occur in the neighborhood of the carbon nanotubes. This is because a state where carbon nanotubes have adsorbed on the surface of fluorine-containing resin particles are more stable, and as a result the long carbon nanotubes will adsorb spontaneously on the surface of the added fluorine-containing resin particles by means of forces caused mainly by van der Waals force.

Thus, it is possible that by mixing fluorine-containing resin particles into a dispersion in which the long carbon nanotubes have been dispersed in low density, the long carbon nanotubes are allowed to be dispersed uniformly on the surface of fluorine-containing resin particles at lower concentrations than those used in conventional procedures, without impairing properties of the carbon nanotubes.

In this case, it is possible that the long carbon nanotubes are allowed to adsorb on the surface of the fluorine-containing resin particles in a condition where their highly dispersed state is maintained, by selecting optimal conditions for the temperature of the solvent in the vessel 1, the rate of addition of ethanol, the concentration of dispersed carbon nanotubes in the dispersion, the rate of addition of the fluorine-containing resin particles, and the concentration of dispersed fluorine-containing resin particles in the dispersion in the above-mentioned Steps 2 and 3.

Step 3 (adding of fluorine-containing resin particles to the dispersion) may be started after or before the completion of Step 2 (adding of ethanol to the dispersion).

A mixed slurry containing the resin material particles and the carbon nanotubes can be prepare by the above-mentioned Steps 1 to 3.

(Step 4)

Step 4 is the step in which carbon dioxide is supplied with stirring to the mixed slurry prepared in the above-mentioned Step 3.

Specifically, as shown in FIG. 1, a predetermined amount of the mixed slurry is first supplied from the container 1 through a line L2 to a pressure vessel 3. Then, carbon dioxide is supplied from a carbon dioxide source (not shown) through a line L3 to the pressure vessel 3 while stirring inside pressure vessel 3 with a stirrer 4. Meanwhile, the gas-phase component in the pressure vessel 3 is discharged through a line L5 to the outside of the pressure vessel 3.

The way carbon dioxide is supplied to the pressure vessel 3 is not limited in particular, and carbon dioxide may be supplied either in a liquid state or in a gaseous state.

The explanation which follows is made on the case where, in the present embodiment, liquid carbon dioxide is used as the carbon dioxide.

The line L3 is provided with a flow meter 9 and an on-off valve 10, which allow one to adjust, to a predetermined amount, the amount of addition of liquid carbon dioxide to be supplied to the pressure vessel 3. In addition, the line L5 is provided with a pressure control valve 11, which allows one to keep, at a predetermined pressure, the pressure in the pressure vessel 3 which is on the primary side of the valve.

By supplying liquid carbon dioxide to the liquid phase (the mixed slurry) within the pressure vessel 3 with stirring in the aforementioned manner, the dispersing agents are detached from the surface of each of the long carbon nanotubes in the mixed slurry.

In addition, as the amount of addition of liquid carbon dioxide increases, the proportion of the concentration of liquid carbon dioxide increases along with the decrease in the concentration of ethanol in the liquid phase, resulting in a decrease in the ethanol which coordinates on the surface of the fluorine-containing resin particles.

Further, the dispersing agent which has been detached from the surface of the long carbon nanotubes, the ethanol, and the water are discharged out of the pressure vessel 3 together with the carbon dioxide.

Thus, the long carbon nanotubes from the surface of which the dispersing agent has been detached adsorb spontaneously on the surface of the fluorine-containing resin particles by means of forces caused mainly by van der Waals force.

In addition, since liquid carbon dioxide is supplied to the mixed slurry with stirring, thereby resulting in homogeneous dispersion of the long carbon nanotubes, the unevenness in the direction of gravity of the carbon nanotubes on the fluorine-containing resin particles is prevent, so that the carbon nanotubes can be allowed to adsorb uniformly on the almost entire surface of the fluorine-containing resin particles.

In Step 4, when liquid carbon dioxide is supplied to the inside of the pressure vessel 3, ethanol may be supplied through a line L4 to the inside of the pressure vessel 3. By supplying ethanol at the same time as liquid carbon dioxide to the inside of the pressure vessel 3 in the aforementioned manner, the decrease in the concentration of ethanol in the pressure vessel 3 can be slowed. Therefore, it is possible that the long carbon nanotubes are allowed to adsorb on the surface of the fluorine-containing resin particles while the long carbon nanotubes in the solvent in the pressure vessel 3 are maintained in a state where they are highly dispersed in the solvent.

(Step 5)

Step 5 is the step of holding a temperature and a pressure where the liquid carbon dioxide which has been supplied to the mixing slurry can be maintained in a subcritical or supercritical state.

Specifically, as shown in FIG. 1, the inside of the pressure vessel 3 is first subjected to heating and pressuring using a pressurizing device (not shown) and a temperature controlling device 5, so as to achieve a temperature and a pressure which allow the liquid carbon dioxide to be maintained in a subcritical or supercritical state. Then, the temperature and pressure which allow the liquid carbon dioxide to be maintained in a subcritical or supercritical state are kept for a predetermined period of time. Therefore, the dispersing agent is removed from the surface of the carbon nanotubes by applying predetermined conditions to the liquid carbon dioxide which has been supplied to the inside of the pressure vessel 3. At the same time, the carbon dioxide under the predetermined conditions can swell the surface of the fluorine-containing resin particles, making it possible that the long carbon nanotubes are incorporated onto and fixed on the surface of the resin particles.

Here, a supercritical state refers to a state of a substance in which the temperature and pressure are equal to or above those at its critical point. In the case of carbon dioxide, its supercritical state is a state in which the temperature is 31.1° C. or higher and the pressure is 72.8 atm or higher. In such a state, since the carbon dioxide has properties whereby it diffuses as a gas and dissolves as a liquid, it can swell the surface of the fluorine-containing resin particles while diffusing into the resin surface, thereby allowing the long carbon nanotubes to be incorporated onto the surface of the resin particles. A subcritical state, on the other hand, refers to a state of a substance in which the pressure is equal to or above that at its critical point and the temperature is equal to or below that at its critical point. Also in such a state, the carbon dioxide can efficiently swell the surface of the fluorine-containing resin particles.

(Step 6)

Step 6 is the step in which an entrainer with affinity to the dispersing agent is added inside an atmosphere of supercritical carbon dioxide. Specifically, as shown in FIG. 1, an on-off valve 8 provided in the line L4 is first opened and a predetermined amount of an entrainer is supplied through a flow meter 7 to the inside of pressure vessel 3 which has an atmosphere of supercritical carbon dioxide. Then, the temperature controlling device 5 is operated to change the temperature of the supercritical carbon dioxide in the pressure vessel 3, thereby to extract only the dispersing agent from within the pressure vessel 3 through the line 5.

By supplying an entrainer to the inside of the pressure vessel 3 in the aforementioned manner, the residual dispersing agent can be detached from the surface of the long carbon nanotubes which have been incorporated onto the surface of the fluorine-containing resin particles. In consequence, the dispersing agent does not remain on the surface of the carbon nanotubes, and thus composite resin material particles having high conductivity can be obtained.

As the entrainer, the aforementioned alcohols are applicable. In the present embodiment, ethanol, which is the alcohols used in forming the mixed slurry, can be used as the entrainer.

In this case, the addition of an entrainer is for efficient detachment of the residual dispersing agent, and the supplying of an entrainer is not always essential: the residual dispersing agent will be able to be detached by simply supplying carbon dioxide, if a sufficient period of time is allowed.

(Step 7)

Step 7 is the step of transferring the liquid carbon dioxide to the outside of the pressure vessel 3. Specifically, as shown in FIG. 1, the pressure control valve 11 is operated to reduce the pressure (depressurize) inside the pressure vessel 3, thereby to discharge the gas-phase carbon dioxide out of the pressure vessel 3 through the line L5.

By using carbon dioxide in a subcritical or supercritical state as a liquid for swelling the fluorine-containing resin in the aforementioned manner, the carbon dioxide can be completely removed due to a simple operation of reducing the pressure, after the end of the above-mentioned Step 5 in which the long carbon nanotubes are incorporated onto the surface of the resin particles.

In the present embodiment, the carbon dioxide which is transferred out of the pressure vessel 3 may be collected. Specifically, the gas-phase carbon dioxide which has been discharged into the line L5 is supplied to a vessel 6, which is placed on the secondary side of the pressure control valve 11. Since the carbon dioxide is depressurized by means of the pressure control valve 11, the dispersing agent, the ethanol, and the water which have been transferred together with the collected carbon dioxide segregate and are recovered in the vessel 6. Thus, the carbon dioxide from which the dispersing agent, the ethanol, and the water have been removed can be recovered through a line L7, which is connected to the vessel 6.

Also in the present embodiment, a line L8 may be placed on the bottom of the pressure vessel 3 and provided with an on-off valve 15 and a measuring means (not shown). By proving a measuring means, such as a concentration meter or the like, the amount of recovery of the residual component(s) of any one or more of the water, ethanol, and dispersing agent in the vessel 6 can be measured. In addition, by determining the relationship between measurement results and the amounts of supply of liquid carbon dioxide in Step 4, the amount of liquid carbon dioxide to be supplied to the pressure vessel 3 in the above-mentioned Step 4 can be subjected to feed-back control.

Further, in the present embodiment, the line L7 for recovering the carbon dioxide may be provided with a pressure control valve 13 and a circulation pump 14, and may also be connected to the primary side of the flow meter 9 in the line L3, so that the carbon dioxide which has been recovered from the pressure vessel 3 is liquefied, followed by re-supplying the liquefied carbon dioxide to pressure vessel 3. The increase in production cost can be suppressed by reusing the carbon dioxide supplied to the pressure vessel 3 in the aforementioned manner.

(Step 8)

Step 8 is the step of filtering the mixed slurry of the carbon nanotube dispersion and the fluorine-containing resin particles, thereby to recover the fluorine-containing resin particles having the long carbon nanotubes impregnated thereon. Specifically, as shown in FIG. 1, a line L6 is connected to the lower part of the pressure vessel 3, and an on-off valve 12 placed on the line L6 is opened to recover from the pressure vessel 3 the fluorine-containing resin particles having the long carbon nanotubes impregnated thereon.

(Step 9)

Step 9 is the step of removing the carbon dioxide dissolved in the fluorine-containing resin particles. Specifically, the fluorine-containing resin particles having the long carbon nanotubes impregnated thereon, which have been recovered in the above-mentioned Step 8, are warmed under vacuum in a vacuum electric furnace. This allows vaporization of the solvent attached to, along with removal of the carbon dioxide dissolved in, the fluorine-containing resin particles.

Composite resin material particles of the present embodiment can be produced by the above-mentioned Steps 1 to 9.

(Step 10)

Step 10 is the step of pressure forming the composite resin material particles obtained by the above-mentioned Steps 1 to 9. Specifically, the fluorine-containing resin particles having long carbon nanotubes incorporated thereon are filled into a mold, followed by molding them by applying a predetermined pressure at ordinary temperature.

(Step 11)

Step 11 is the step of calcining the molded fluorine-containing resin particles. Specifically, the fluorine-containing resin particles which have been molded in the above-mentioned Step 10 are calcined at a temperature which allows decomposing the dispersing agent remaining on these particles and which is suitable for molding the fluororesin.

Composite resin material moldings of the present embodiment can be produced by the above-mentioned Steps 10 and 11.

In the past, attempts have been made to prepare composite materials of long carbon nanotubes added in small amounts, resin particles, and the like, using dispersions in which carbon nanotubes have been dispersed in low density. However, the long carbon nanotubes were dispersed in a relatively uniform state in the dispersion, but rapidly agglomerated with one another when attempts were made to attach them to the resin particle surface, thereby making it impossible to control the attachment of the carbon nanotubes to the resin particle surface.

On the other hand, it is possible that by adding to the dispersion a low-polarity solvent as a dispersion solvent, long carbon nanotubes are attached to the resin particle surface: however, the control of the attachment of carbon nanotubes to the resin particle surface has been not achieved by simply adding a nonpolar solvent to the dispersion. That is, the surface of the long carbon nanotubes has a large amount of the dispersing agent coordinated thereon, but when the dispersing agent is detached at once from the long carbon nanotubes, the long carbon nanotubes will agglomerate with one another. Therefore, there is a problem that the resin particle surface has an intense black color because the long carbon nanotubes agglomerate with one another on the resin particle surface.

In contrast, a method for producing composite resin material particles of an embodiment of the present invention includes the step in which ethanol and a fluorine-containing resin are added to an aqueous dispersion in which long carbon nanotubes have been dispersed in low density, thereby to form a mixed slurry having the long carbon nanotubes and the fluorine-containing resin dispersed homogeneously in a solvent, to which liquid carbon dioxide is in turn added with stirring. The addition of liquid carbon dioxide to the mixed slurry with stirring results in gradual removal of the dispersing agent having coordinated on the carbon nanotubes. At the same time, since the addition of liquid carbon dioxide reduces the concentration of ethanol in the solvent, adsorption of the long carbon nanotubes will take place in a state in which they are dispersed uniformly on the hydrophobic fluororesin surface. In consequence, small amounts of addition of carbon nanotubes allow the production of composite resin material particles having high conductivity. In addition, carbon nanotubes are prevented from attachment to the resin particle surface in a state in which they agglomerate with one another, and thus the resin particle surface will not take on a black color.

Specific examples are provided below.

Experiment 1

Production of Composite Resin Material Particles

The apparatus shown in FIG. 1 were used to produce composite resin material particles by the procedures mentioned below.

First, a beaker was filled with 20 ml of ion-exchanged water, to which 200 mg of sodium cholate was added as a dispersing agent. Subsequently, the mixture was subjected to ultrasonic dispersion for 10 minutes using an ultrasonic disperser (ULTRA SONIC HOMOGENIZER UH-50, SMT Co., Ltd.; 50 W, 20 kHz), to prepare an aqueous dispersing agent solution.

Highly oriented carbon nanotubes (with an average diameter of 11 nm and an average length of 145 μm) were produced on a silicon substrate according to the method disclosed in Japanese Patent Application Publication No. 2007-222803, titled "CATALYST FOR GROWING CARBON NANOSTRUCTURE, METHOD FOR PRODUCING CARBON NANOSTRUCTURE, AND GAS AND CARRIER GAS FOR, AND APPARATUS FOR PRODUCING CARBON NANOSTRUCTURE".

Then, the carbon nanotubes produced were detached from the silicon substrate, and 10 mg of the carbon nanotubes was added to the aqueous dispersing agent solution. The mixture was then subjected to ultrasonic dispersion for 30 minutes using the above-mentioned ultrasonic disperser (50 W, 20 kHz), to prepare an aqueous dispersion of the carbon nanotubes.

To the aqueous dispersion of the carbon nanotubes was added 80 ml of ethanol, and the mixture was subjected to ultrasonic dispersion for 10 minutes using the ultrasonic disperser (50 W, 20 kHz), to prepare a carbon nanotube dispersion.

Next, a vessel equipped with a stirrer was filled with 100 g of the carbon nanotube dispersion prepared. After that, 20 g of fluororesin (PTFE; M-18F, DAIKIN INDUSTRIES, LTD.; an average particle diameter of 25 μm) was slowly added over 5 minutes while operating the stirrer, to prepare a mixed slurry of the carbon nanotube dispersion and the fluororesin.

Then, a pressure vessel equipped with a stirrer was filled with 120 g of the mixed slurry prepared, using a slurry pump. After that, a total of about 100 g of liquefied carbon dioxide was filled at a rate of 10 g/min for 11 minutes, during which the liquefied carbon dioxide was filled while discharging the gasified carbon dioxide, by adjusting the pressure releasing valve which was attached to the pressure vessel.

After the completion of filling of the liquefied carbon dioxide, a heater BOX surrounding the pressure vessel was turned on in a condition where the stirrer attached to the pressure vessel was being operated, and adjusted such that the temperature within the pressure vessel reached 65° C., thereby to bring the carbon dioxide within the pressure vessel into a supercritical state. At this time, the pressure within the pressure vessel was about 25 MPa.

When the temperature within the pressure vessel reached 65° C., filling of additional liquefied carbon dioxide while operating the stirrer was started and continued at a filling rate of 1 g/min for 2 hours. During this period, the filling of liquefied carbon dioxide was carried out while discharging a gas-liquid mixture gas in which the gasified carbon dioxide and the dispersing solution which dissolved into carbon dioxide (solvent+dispersing agent) were mixed, by adjusting the pressure releasing valve attached to the pressure vessel.

After two hours had passed, the supply of liquefied carbon dioxide was stopped, and the gas-liquid mixture gas within the pressure vessel was discharged through the pressure releasing valve until the pressure within the pressure vessel decreased down to atmospheric pressure. Then, the mixed slurry of the carbon nanotube dispersion and the fluororesin which had been left in the pressure vessel was transferred to a filtration/recovery apparatus, using a slurry pump.

The gas-liquid mixture gas which were discharged through the pressure releasing valve, on the other hand, was introduced into a gas-liquid separation tank, where it was separated into the gaseous carbon dioxide and the liquid, dispersing solution (solvent+dispersing agent). The carbon dioxide which had been separated and recovered was liquefied and reused. For the dispersing solution (solvent+dispersing agent), the solvent was dried, and only the dispersing agent was recovered and reused.

The mixed slurry of the carbon nanotube dispersion and the fluororesin which had been transferred to the filtration/recovery apparatus was filtered through a filter for filtration (a membrane filter having a diameter of 47 mm and a pore size of 0.1 μM, Millipore Corporation).

On the upstream side of the filtration/recovery apparatus, about 20 g of an electrically conductive fluororesin raw-material on which the carbon nanotubes had been attached at an addition concentration of 0.05% by mass was obtained. On the downstream side of the filtration/recovery apparatus, a colorless and clear solution (solvent+dispersing agent) was recovered.

About 5 g of the electrically conductive fluororesin raw-material obtained was placed in a mold, and then a manual compression molding press (MH-50, Sansho Industry Co., Ltd.) was used for molding it under conditions of ordinary temperature and a pressure of 40 MPa, thereby giving an electrically conductive fluororesin premolding having a diameter of about 30 mm, a thickness of about 3 mm, and a density of 2.1 g/cm$^3$.

Furthermore, the electrically conductive fluororesin pre-molding was subjected to calcining in a vacuum electric furnace (a vacuum box furnace MB-888-V, Koyo Thermo Systems Co., Ltd.), to obtain an electrically conductive fluororesin molding.

For this electrically conductive fluororesin molding, its volume resistivity [$\Omega \cdot cm$] was measured using a 4-terminal method (ASP probe) on a volume resistivity meter (Loresta GP, MCP-T600, Mitsubishi Chemical Co., Ltd.). As a result, the electrically conductive fluororesin molding was found to have a volume resistivity of $3.49 \times 10^3$ $\Omega \cdot cm$, and it was ascertained that although the concentration of the carbon nanotubes added was an extremely low addition concentration of 0.05% by mass, a material with high electrical conductivity exhibiting a low electrical resistance value was formed.

Experiment 2

Figure 2:
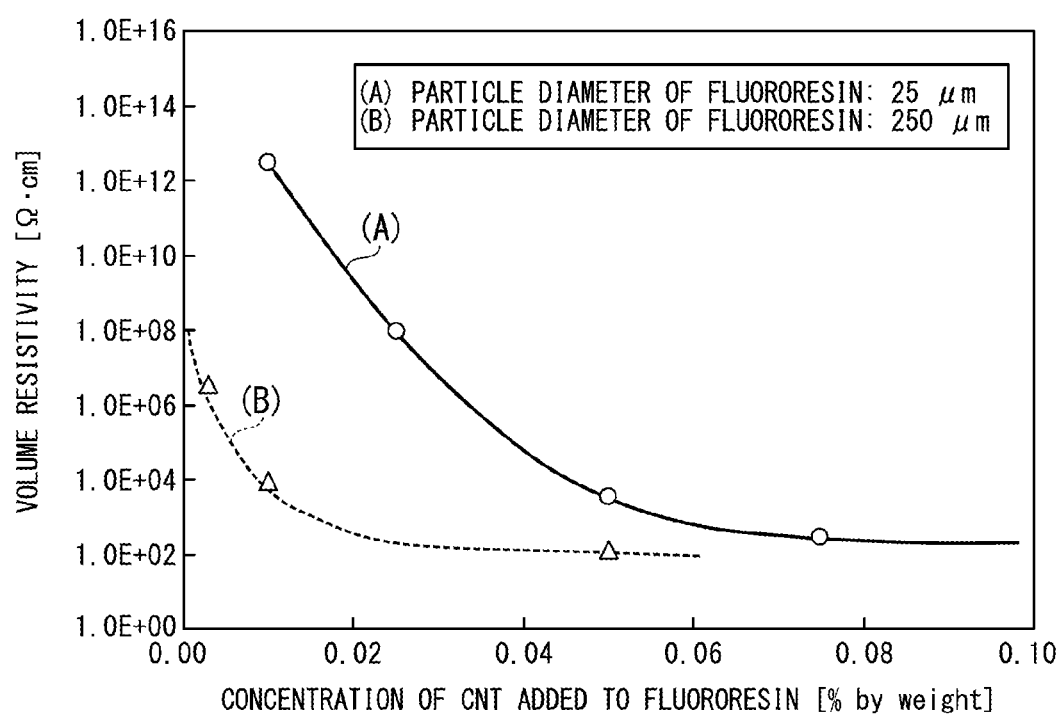
FIG. 2 is a graph for explaining the relationship between the concentration of carbon nanotubes added to resin material particles and volume resistivity, showing relationships where (A) the resin particle diameter is 25 μm and (B) the resin particle diameter is 250 μm.

Relationship Between the Concentration of Carbon Nanotubes Added and Volume Resistivity According to the procedures shown in the above-mentioned Experiment 1, electrically conductive fluororesin moldings were prepared in which the concentration of carbon nanotubes added was changed to 0.01%, 0.025%, 0.05%, and 0.075% by mass. Volume resistivities of the resulting electrically conductive fluororesin moldings were measured. The results are shown in FIG. 2. As shown by (A) in FIG. 2, these moldings had a volume resistivity of $2.81 \times 10^{12}$, $8.98 \times 10^7$, $3.49 \times 10^3$, and 268 $\Omega \cdot cm$, respectively.

Experiment 3

Relationship Between the Concentration of Carbon Nanotube Added and Volume Resistivity Experiments were carried out in the same way as the above-mentioned experiments where the average particle diameter was 25 μm, except that fluororesin particles with an average particle diameter of 250 μm were used as the fluororesin particles and the concentration of carbon nanotubes added was changed to 0.003%, 0.01%, and 0.05% by mass. The results are shown in FIG. 2. As shown by (B) in FIG. 2, these moldings had a volume resistivity of $3.45 \times 10^6$, $8.90 \times 10^3$, and 129 $\Omega \cdot cm$, respectively.

REFERENCE SIGNS LIST

1: Vessel
2,4: Stirrer
3: Pressure vessel
5: Temperature controlling device
6: Vessel
7, 9: Flow meter
8, 10, 12, 15: On-off valve
11, 13: Pressure control valve
14: Circulation pump
20: Equipment for producing composite resin material particles
L1-L8: Line

The invention claimed is:

1. A composite resin material particle which is used as a raw material for a composite resin molding, the composite resin material particle comprising:
a resin material particle and carbon nanotubes dispersed uniformly and fixed on the surface of the resin material particle at not less than 0.003% and not more than 0.1% by mass relative to the resin material particle, wherein a volume resistivity is $1.0 \times 10^8$ $\Omega \cdot cm$ or less,
the carbon nanotubes have an average length of not less than 50 μm and not more than 250 μm, and
the particle diameter of the resin material particle is 1 μm to 500 μm.

2. The composite resin material particle according to claim 1, wherein the resin material particle is of a fluorine-containing resin material.

3. A method for producing a composite resin material particle according to claim 1, the method comprising the steps of:
forming a mixed slurry containing at least a resin material particle and carbon nanotubes;
supplying the mixed slurry to a pressure vessel, followed by supplying carbon dioxide with stirring an inside of the pressure vessel;
holding the inside of the pressure vessel at a temperature and at a pressure which allow the carbon dioxide to be maintained in a subcritical or supercritical state; and
transferring the carbon dioxide to the outside of the pressure vessel.

4. The method for producing the composite resin material particle according to claim 3, wherein the step of forming the mixed slurry comprises the steps of:
mixing the carbon nanotube and a dispersing agent into water to form an aqueous dispersion of the carbon nanotubes; and
adding the resin material particles and alcohols to the aqueous dispersion.

5. The method for producing the composite resin material particle according to claim 4, wherein the alcohols are any one or a mixture of two or more of methanol, ethanol, isopropyl alcohol, n-butyl alcohol, propylene glycol, and ethylene glycol.

6. The method for producing the composite resin material particle according to claim 4, wherein the alcohols are simultaneously supplied when the liquid carbon dioxide is supplied.

7. The method for producing the composite resin material particle according to claim 3, wherein the carbon nanotubes has an average length of not less than 50 μm and not more than 250 μm.

8. The method for producing the composite resin material particle according to claim 3, wherein the resin material particle is of a fluorine-containing resin material.

9. The method for producing the composite resin material particle according to claim 3, further comprising the step of collecting the carbon dioxide which is transferred out of the pressure vessel.

10. The method for producing the composite resin material particle according to claim 9, wherein the amount of recovery of any one or more of the water, the alcohols, and the dispersing agent that have been transferred together with the collected carbon dioxide is measured, and the amount of supply of the carbon dioxide to the pressure vessel is selected.

11. The method for producing the composite resin material particle according to claim 9, wherein the carbon dioxide which has been transferred out of the pressure vessel is liquefied, followed by supplying the liquefied carbon dioxide to the pressure vessel.

12. A composite resin molding prepared by using the composite resin material particle according to claim 1 as a raw material, wherein a content of the carbon nanotubes is not less than 0.003% and not more than 0.1% by mass relative to the resin material particle, and a volume resistivity is $1.0 \times 10^8$ Ω·cm or less.

13. A method for producing a composite resin molding in which the composite resin material particle according to claim 1 is used as a raw material, the method comprising:

subjecting the composite resin material particles to pressure forming, followed by calcining.

* * * * *